US006427433B1

(12) United States Patent
Kubota et al.

(10) Patent No.: US 6,427,433 B1
(45) Date of Patent: Aug. 6, 2002

(54) ROCKER JOINT PIN FOR CHAIN, AND METHOD AND APPARATUS FOR PRODUCING THE ROCKER JOINT PIN

(75) Inventors: Seiichi Kubota; Yoshiaki Takagishi, both of Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/671,805

(22) Filed: Sep. 28, 2000

(30) Foreign Application Priority Data

Sep. 28, 1999 (JP) .......................... 11-274639

(51) Int. Cl.⁷ .................... F16G 13/04; B21L 17/00
(52) U.S. Cl. ................. 59/35.1; 59/29; 59/901; 474/215; 474/216; 474/217
(58) Field of Search ..................... 59/29, 23, 24, 59/18, 35.1, 901, 4; 474/215, 216, 217

(56) References Cited

U.S. PATENT DOCUMENTS

| 3,857,311 A | * | 12/1974 | Esser | 59/35.1 |
| 3,961,474 A | * | 6/1976 | Esser | 59/23 |
| 4,694,644 A | * | 9/1987 | Rudy et al. | 59/27 |
| 6,260,345 B1 | * | 7/2001 | Kanehira et al. | 59/4 |

* cited by examiner

Primary Examiner—David Jones
(74) Attorney, Agent, or Firm—Howson & Howson

(57) ABSTRACT

A rocker joint pin for use in a chain to articulately interconnect link plates of the chain has a beveled edge at opposite end faces thereof. The beveled edge is formed by forming a V-shaped groove transversely across a surface of a continuous wire and subsequently severing the wire at the bottom of the V-shaped groove.

13 Claims, 2 Drawing Sheets

ROCKER JOINT PIN FOR CHAIN, AND METHOD AND APPARATUS FOR PRODUCING THE ROCKER JOINT PIN

BACKGROUND OF THE INVENTION

1. Field of the Invention

The present invention relates to a rocker joint pin for used in a chain to articulately interconnect link plates of the chain, and a method of and an apparatus for producing the rocker joint pin.

2. Description of the Related Art

A chain is constituted by a large number of link plates articulately connected together in an endless fashion by means of connecting pins. The connecting pins are generally classified into two types, one being a round pivot pin and the other being a rocker joint pin. The rocker joint pin is used in many case for silent chains and also for chain belts of continuous variable transmissions (CVTs).

Conventionally, in the manufacture of a connecting pin, a continuous wire drawn in a cross-sectional shape substantially the same as that of a finished connecting pin is cut off or severed into pin stocks of product length. The pin stocks are then subjected to chamfering to form a beveled edge at both longitudinal end faces of each individual pin stock. The chamfering is effected to ensure that the connecting pins can be smoothly inserted into pin-accommodating holes in the link plates during the process of assembling the chain. The chamfered pin stocks are heat treated and then finished into a final shape of the pins.

In the case of the round pivot pin, chamfering is generally achieved by way of barrel finishing (tumbling) or pin-heading (forging). In the case of the rocker joint pins, chamfering is generally achieved by way of barrel finishing. A pin-heading (forging) operation or a cutting operation is used sometimes.

The barrel finishing operation used for chamfering the rocker joint pins is disadvantageous due to a difficulty in forming a sufficiently large chamfered or beveled edge. An attempt to produce a sufficiently large beveled edge by the barrel finishing requires a considerably long processing time, tending to cause undesired removal of material from a different part of the rocker joint pin, such as a convexly arcuate surface. The thus finished rocker joint pin no longer possesses the original cross-sectional shape.

The pin-heading (forging) process used for chamfering the rocker joint pins is also disadvantageous in that, due to a change in the cross-sectional shape of the rocker joint pin, an accurate pin-heading operation is difficult to achieve.

In the case where the pin-heading (forging) operation or the cutting operation is carried out to chamfer the rocker joint pins of a product length, a parts feeder or the like orienting machine must be provided to arrange the individual rocker joint pins into a desired orientation before the pins are processed or chamfered by a pin-heading machine or a cutting machine. This requirement increases the equipment cost, leading to an increase in the manufacturing cost of the rocker joint pins.

SUMMARY OF THE INVENTION

It is, accordingly, a general object of the present invention to overcome the problems associated with the conventonal chamfering processes used for forming a beveled edge at both longitudinal end faces of a rocker joint pin.

A more specific object of the present invention is to provide a rocker joint pin for chains, which can be manufactured at a relatively low cost and smoothly assembled with link plates of a chain.

Another object of the present invention is to provide a method which is capable of economically producing a rocker joint pin having a sufficiently large beveled edge at opposite end faces of the pin.

A further object of the present invention is to provide an apparatus for reducing the method into practice.

A still further object of the present invention is to provide a rocker joint pin produced by the foregoing method.

According to one aspect of the present invention, there is provided a rocker joint pin for use in a chain to articulately interconnect link plates of the chain, the rocker joint pin having a beveled edge formed at opposite end faces thereof, the beveled edge having been subjected to grooving to form a V-shaped groove transversely across a surface of a continuous wire, and the end faces having been subjected to cutting to sever the wire at the bottom of the V-shaped groove.

According to another aspect of the present invention, there is provided a method of producing a rocker joint pin for a chain, the pin having a beveled edge at opposite end faces thereof, the method comprising the steps of: intermittently feeding a continuous wire longitudinally along a path; forming a V-shaped groove transversely across a surface of the wire while the wire is at rest; and cutting the wire at the bottom of the V-shaped groove while the wire is at rest, thereby producing a rocker joint pin having a beveled edge at opposite end faces thereof.

The forming step may be achieved either by reciprocating a groove forming punch in a direction perpendicular to the path, or alternatively by reciprocating a cutting tool in a direction orthogonal to the path. The groove forming punch and the cutting tool have a V-shaped cutting edge.

According to still another aspect of the present invention, there is provided an apparatus for producing a rocker joint pin for a chain, the rocker joint pin having a beveled edge at opposite end faces thereof, the apparatus comprising: a feed unit for intermittently feeding a continuous wire longitudinally along a path; a grooving unit disposed downstream of the feed unit for forming a V-shaped groove transversely across a surface of the wire while the wire is at rest; and a cutting unit disposed downstream of the grooving unit for severing the wire at the bottom of the V-shaped groove while the wire is at rest, thereby producing a rocker joint pin having a beveled edge at opposite end faces thereof.

The apparatus may further comprise a positioning unit disposed downstream of the cutting unit for positioning a leading end of the wire.

In one preferred form, the grooving unit comprises a fixed die disposed on one side of the path for supporting one surface of the wire, and a movable grooving punch disposed on the opposite side of the path and reciprocally movable toward and away from the fixed die for forming the V-shaped groove on the opposite surface of the wire, the grooving punch having a V-shaped cutting edge. Preferably, the fixed die has a guide surface so profiled as to comport with a profile of the one surface of the wire, and the cutting edge of the movable grooving punch has a profile complementary in shape to a profile of the opposite surface of the wire.

As a first alternative, the grooving unit may comprise a cooperating pair of aligned, movable grooving punches disposed on opposite sides of the path and reciprocally movable toward and away from each other for forming the V-shaped groove on opposite surfaces of the wire, the grooving punches having a V-shaped cutting edge. It is preferable that the cutting edge of one of the pair of movable grooving punches has a profile complementary in shape to a profile of one of the opposite surfaces of the wire, and the cutting edge of the other of the pair of movable grooving punches has a profile complementary in shape to a profile of the other of the opposite surfaces of the wire.

As a second alterative, the grooving unit may comprise a cutting tool disposed on one side of the path and movable transversely across the path for forming the V-shaped groove on one surface of the wire, the cutting tool having a V-shaped cutting edge. The grooving unit may further comprise a second cutting tool disposed in alignment with the cutting tool and movable transversely across the path for forming the V-shaped groove on the opposite surface of the wire, the second cutting tool having a V-shaped cutting edge.

In one preferred form, the cutting unit comprises a fixed cutting die having a guide hole aligned with the path for the passage therethrough of the wire, and a movable cutting die having a guide hole normally disposed in alignment with the path for the passage therethrough of the wire. The movable cutting die is movable relative to the fixed die between a first position in which the guide hole in the fixed cutting die and the guide hole in the movable cutting die are aligned with each other, and a second position in which the movable cutting die is offset from the path in a direction orthogonal to the path. Preferably, the apparatus further comprises a knockout pin reciprocally movable within the guide hole in the movable cutting die for discharging a rocker joint pin from the movable cutting die while the movable cutting die is disposed in the second position.

BRIEF DESCRIPTION OF THE DRAWINGS

A preferred embodiment of the present invention will now be described in detail, by way of example only, with reference to the accompanying drawings, in which.

DETAILED DESCRIPTION OF THE PREFERRED EMBODIMENT

The following description is merely exemplary in nature and is in no way intended to limit the invention or its application or uses.

Figure 1:
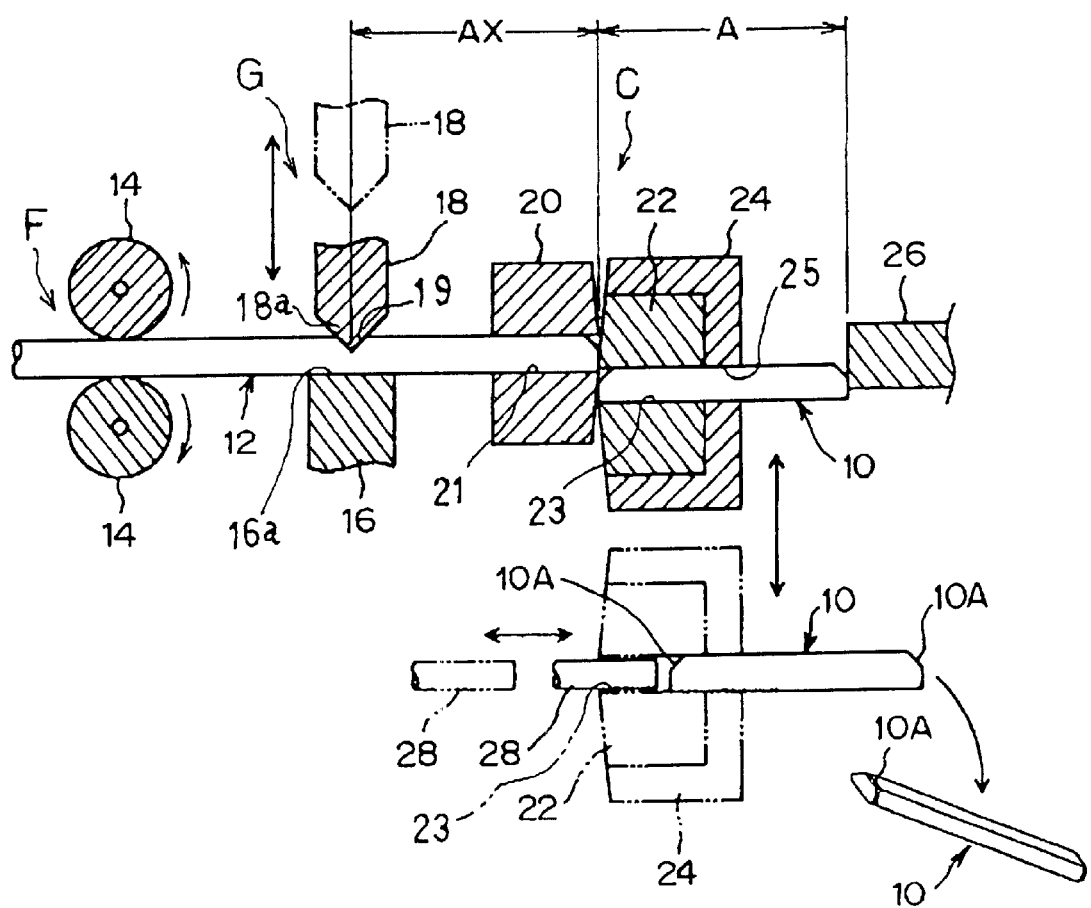
FIG. 1 is diagrammatical front elevational view, partly in cross-section, of an apparatus for producing a rocker joint pin according to an embodiment of the present invention.

Referring now to the drawings and FIG. 1 in particular, there is shown in diagrammatical elevation an apparatus for producing a rocker joint pin 10 used for assembling a chain.

The rocker joint pin 10 is produced from a continuous wire 12 and has a beveled edge 10A at opposite end faces of the pin 10. The rocker joint pin 10 is subsequently subjected to a heat treatment process followed by a finishing process. The wire 12 has a cross-sectional shape substantially the same as that of a finished rocker joint pin (not shown).

The apparatus generally comprises a feed unit F for intermittently feeding a continuous wire 12 longitudinally along a path, a grooving unit G for forming a V-shaped groove transversely across a surface of the wire 12 while the wire 12 is at rest, a cutting unit C for severing the wire 12 at the bottom of the V-shaped groove while the wire 12 is at rest, thereby producing a rocker joint pin 10 having a beveled edge 10A at opposite end faces thereof, a positioning unit 26 for positioning a leading end of the wire 12, and a discharging unit D for discharging the rocker joint pin 10 from the cutting unit C. The apparatus is of the horizontal type, and all of the units excepting the discharging unit 28 are disposed horizontally in succession along the feed path of the wire 12. The discharging unit D is disposed below the cutting unit C. The discharge unit D can be omitted when the apparatus is of the vertical type in which the wire 12 is fed along a vertical path.

The feeding unit F is disposed at an upstream end of the apparatus and has a cooperating pair of feed rollers 14, 14 rotatably mounted to a frame (not shown) of the apparatus. The feed rollers 14, 14 are driven to rotate in opposite directions as indicated by the arrows in FIG. 1 so as to feed the wire 12 intermittently downstream along the horizontal path.

The grooving unit G is disposed downstream of the feeding unit F and comprises a fixed die 16 firmly secured to the non-illustrated frame of the apparatus at one side (lower side) of the feed path, and a movable grooving punch (grooving tool) 18 disposed on the other side of the feed path and and vertically movable toward and away from the fixed die 16 in timed relation to intermittent advancing movement of the wire 12 so that a V-shaped groove 19 is formed transversely across a surface of the wire 12 while the wire 12 is at rest.

The cutting unit C is disposed downstream of the grooving unit G and comprises a fixed cutting die 20 firmly secured to the non-illustrated frame of the apparatus, and a movable cutting die 22 held by a die holder 24 and vertically movable relative to the fixed cutting die 20 for cutting or severing the wire 12 at the bottom of the V-shaped groove 19 while the wire 12 is at rest, thereby producing a rocker joint pin 10 of a product length. The fixed die 20 has a guide hole 21 aligned with the horizontal path for the passage therethrough of the wire 12. Similarly, the movable die 22 has a guide hole 23 normally disposed in alignment with the horizontal path for the passage therethrough of the wire 12. The holder 24 also has a guide hole 24 aligned with the guide hole 23 of the movable cutting die 22 for the passage therethrough of the wire 12. The movable cutting die 22 is movable between a first position in which the respective guide holes 21, 23 of the fixed and movable cutting dies 20, 22 are aligned with each other, and a second position in which the movable cutting die 22 is offset from the feed path in a downward direction, as indicated by the phantom lines shown in FIG. 1.

The positioning unit 26 comprises a stopper disposed downstream of the cutting unit C for abutment with the leading end of the wire 12 to position the V-shaped groove 19 relative to the cutting unit C.

The discharging unit 28 comprises a knockout pin horizontally disposed below the fixed cutting die 20 and reciprocally movable within the guide hole 23 of the movable cutting die 22 for discharging a rocker joint pin 10 from the movable cutting die 22 while the movable cutting die 22 is disposed in the phantom-lined second position (discharging position) shown in FIG. 1.

Figure 2:
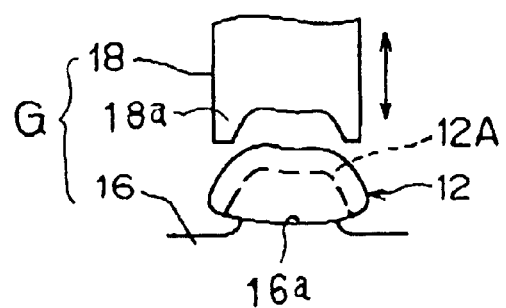
FIG. 2 is a side view of a notching unit of the apparatus shown in FIG. 1.

The movable grooving punch 18 of the grooving unit G has a V-shaped cutting edge 18a. As shown in FIG. 2, the cutting edge 18a of the movable grooving punch 18 has a profile complementary in shape with the profile of an upper surface of the wire 12. Similarly, the fixed die 16 has an upper surface (guide surface) 18a so profiled as to comport with the profile of a lower surface of the wire 12.

Referring back to FIG. 1, the fixed cutting die 20 and the movable cutting die 22 have two opposed sliding surfaces normally held in face to face contact with each other. The cutting dies 20, 22 each have a cutting edge (not designated) formed around the periphery of the guide hole 21, 23 at an end opening to the sliding surface of a corresponding one of the cutting dies 20, 22.

The stopper 26 is horizontally spaced from a cutting plane (containing a contact point between the fixed cutting die and the movable cutting die 22) by a distance A which is equal to the product length of the rocker joint pin 10 severed from the wire 12. In addition, the distance AX between the cutting plane and a grooving plane (containing the axis of movement of the pointed cutting edge of the movable grooving punch 18) is an integral multiple of the distance A.

The apparatus of the foregoing construction operates as follows. The operation begins under the condition in which the movable grooving punch (grooving tool) 18 is disposed in an uppermost standby position indicated by the phantom lines shown in FIG. 1, and the movable cutting die 22 is disposed in the first position in which the respective guide holes 21, 23 of the fixed and movable cutting dies 20, 22 are aligned with each other.

A continuous wire 12 having a cross-sectional shape substantially the same as that of a finished rocker joint pin is supplied between the pair of feed rollers 14, 14 of the feed unit F. The feed rollers 14, 14 are then driven to rotate in the directions indicated by the arrows shown in FIG. 1 so that the wire 12 is advanced through the grooving unit G and the aligned guide holes 21, 23 of the cutting unit C until a leading end of the wire 12 abuts against an end face of the stopper (positioning unit) 26.

Subsequently, the movable grooving punch 18 of the grooving unit G is driven to move downward toward the fixed die 16 so that a V-shaped groove 19 is formed transversely across an upper surface of the wire 12. At the same time, the movable cutting die 22 of the cutting unit C is driven to move downward toward the phantom-lined discharging position whereby a rocker joint pin 10 of a product length A is cut off from the wire 12. While the movable cutting die 22 is in the discharging position, the knockout punch 28 is advanced into the guide hole 23 of the movable cutting die 22 to thereby eject the rocker joint pin 10 from the movable cutting die 22. The ejected rocker joint pin 10 does not have a beveled edge at both end faces thereof and, hence, it is disposed as a waste material.

Thereafter, the knockout pin 28 is retracted away from the guide hole 23 of the movable cutting die 22, and the movable cutting die 22 moves upward to the original first position horizontally aligned with the fixed cutting die 20.

Then, the feed rollers 14 are driven again to feed the wire 12 downward by the predetermined distance A which is equal to the product length of the rocker joint pin 10. By repeating the foregoing cycle of operations several times, the V-shaped groove 19 formed by the movable grooving punch 18 arrives at the cutting unit C where the wire 12 is cut or severed at the bottom of the V-shaped groove 19. Thus, a rocker joint pin 10 having a beveled edge 10A at opposite end faces thereof is produced.

According to the embodiment described above, it becomes possible to provide a relatively large beveled edge 10A formed at opposite end faces of a rocker joint pin 10 without changing the cross-sectional shape of the pin 10. The conventionally employed barrel finishing process cannot realize such a large beveled edge 10A without changing the cross-sectional shape of the rocker joint pin.

The rocker joint pins 10 having a relatively large beveled edge 10A at opposite end faces thereof are able to improve the efficiency of a chain assembling operation because they can be smoothly handled throughout the chan assembling operation without causing any problem such as jamming at a chute in a chain assembling machine, false insertion relative to the pin-accommodating holes in link plates, or damaging at an insertion into the link plates The rocker joint pins having its original cross-sectional shape do not deteriorate the quality of the chain In addition, since the grooving unit G disposed upstream of the cutting unit C forms a V-shaped groove 19 in the continuous wire 12 before the wire 12 is cut into rocker joint pins 10 of a product length, a beveled edge 10A is already formed at opposite ends of a prospective rocker joint pin. Thus, by cutting or severing the wire 12 at the bottom of the V-shaped groove, a rocker joint pin 10 having a beveled edge at opposite end faces thereof is automatically produced. The method and apparatus of the present invention do not require a separate chamfering machine and hence is able to lower the equipment cost. Furthermore, since a relatively large beveled edge 10A can be provided without changing the cross-sectional shape of the rocker joint pin 10, it is possible to omit the surface treatment which is conventionally carried out after the chamfering process to mend the deformed cross-sectional shape of the pin. This may further reduce the manufacturing cost of the rocker joint pin.

Figure 3A:
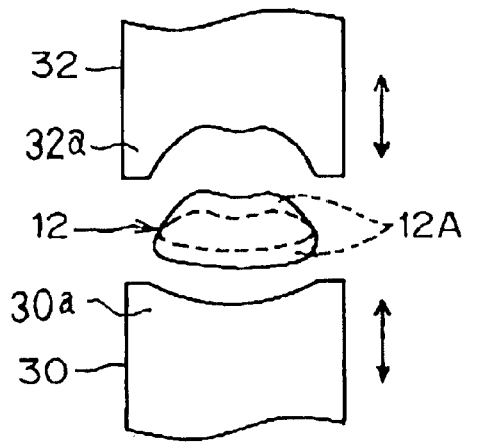
FIG. 3A is a view similar to FIG. 2, but showing a modified notching unit.
Figure 3B:
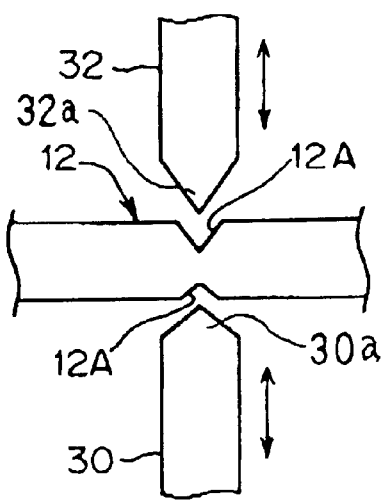
FIG. 3B is a front elevational view of FIG. 3A.

FIGS. 3A and 3B show a modified form of the grooving unit G according to the present invention. The modified grooving unit comprises a cooperating pair of movable grooving punches 30, 32 disposed in vertical alignment with each other. The movable grooving punches 30, 32 each have a V-shaped cutting edge 32a, 32a, as shown in FIG. 3B. As shown in FIG. 3A, the cutting edge 32a of the upper movable grooving punch 32 has a profile complementary in shape with the profile of an upper surface of the wire 12. Similarly, the cutting edge 30a of the lower movable grooving punch 30 has a profile complementary in shape with the profile of a lower surface of the wire 12.

In operation, the upper and lower movable grooving punches 32, 30 are driven to move toward and away from each other so that a V-shaped groove 12A is formed in both the upper and lower surfaces of the wire 12.

Figure 4A:
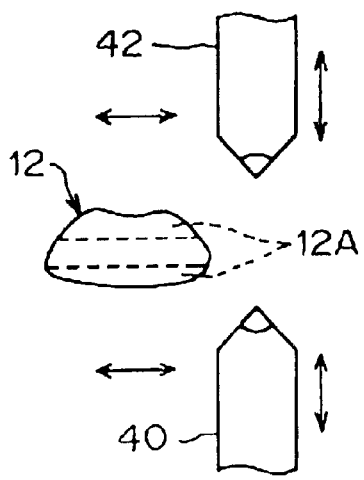
FIG. 4A is a view similar to FIG. 2, but showing another modification of the notching unit.
Figure 4B:
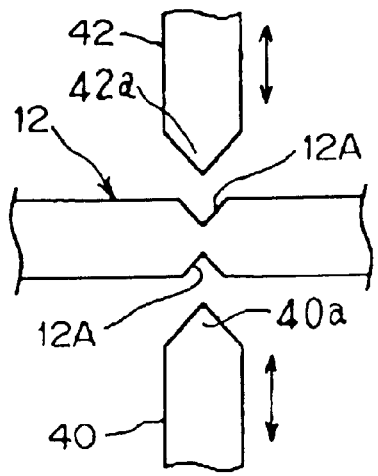
FIG. 4B is a front elevational view of FIG. 4A.

FIGS. 4A and 4B illustrate another modified form of the grooving unit G according to the present invention. The modified grooving unit comprises a pair of vertically aligned cutting tools or bites 40 and 42 normally disposed on one side (right-hand side in FIG. 4A) of the wire 12. The bites 40, 42 have a V-shaped cutting edge 40a, 42a (FIG. 4B) and are movable in both vertical and horizontal directions.

In operation, the upper and lower bites 42, 20 are vertically moved toward each other until the distance between the respective cutting edges of the bites 42, 40 is equal to a thickness of the wire 12 as measured at the bottoms of V-shaped grooves 12A to be produced. Then, the bites 30, 32 are moved horizontally across the thickness of the wire 12 whereby a V-shaped groove 12A is formed on upper and lower surfaces of the wire 12.

Obviously, various minor changes and modifications of the present invention are possible in the light of the above teaching. It is therefore to be understood that within the scope of the appended claims, the present invention may be practiced otherwise than as specifically described.

What is claimed is:

1. A rocker joint pin for use in a chain to articulately interconnect link plates of the chain, said rocker joint pin having a beveled edge formed at opposite end faces thereof, said beveled edge having been subjected to grooving to form a V-shaped groove transversely across a surface of a continuous wire, said end faces having been subjected to cutting to sever the wire at the bottom of the V-shaped groove.

2. A method of producing a rocker joint pin for a chain, the pin having a beveled edge at opposite end faces thereof, said method comprising the steps of:

intermittently feeding a continuous wire longitudinally along a path;

forming a V-shaped groove transversely across a surface of the wire while the wire is at rest; and cutting the wire at the bottom of the V-shaped groove while the wire is at rest, thereby producing a rocker joint pin having a beveled edge at opposite end faces thereof.

3. A method according to claim 2, wherein said forming step is carried out by reciprocating a groove forming punch in a direction perpendicular to said path, the groove forming punch having a V-shaped cutting edge.

4. A method according to claim 2, wherein said forming step is carried out by reciprocating a cutting tool in a direction orthogonal to said path, the cutting tool having a V-shaped cutting edge.

5. A rocker joint pin produced by the method of claim 2.

6. A rocker joint pin produced by the method of claim 3.

7. A rocker joint pin produced by the method of claim 4.

8. An apparatus for producing a rocker joint pin for a chain, the rocker joint pin having a beveled edge at opposite end faces thereof, said apparatus comprising:

a feed unit for intermittently feeding a continuous wire longitudinally along a path;

a grooving unit disposed downstream of said feed unit for forming a V-shaped groove transversely across a surface of the wire while the wire is at rest;

a cutting unit disposed downstream of said grooving unit for severing the wire at the bottom of the V-shaped groove while the wire is at rest, thereby producing a rocker joint pin having a beveled edge at opposite end faces thereof; and a positioning unit disposed downstream of said cutting unit for positioning a leading end of the wire.

9. An apparatus for producing a rocker joint pin for a chain, the rocker joint pin having a beveled edge at opposite end faces thereof, said apparatus comprising:

a feed unit for intermittently feeding a continuous wire longitudinally along a path;

a grooving unit disposed downstream of said feed unit for forming a V-shaped groove transversely across a surface of the wire while the wire is at rest; and a cutting unit disposed downstream of said grooving unit for severing the wire at the bottom of the V-shaped groove while the wire is at rest, thereby producing a rocker joint pin having a beveled edge at opposite end faces thereof, wherein said grooving unit comprises a fixed die disposed on one side of said path for supporting one surface of the wire, and a movable grooving punch disposed on the opposite side of the path and reciprocally movable toward and away from said fixed die for forming the V-shaped groove on the opposite surface of the wire, said grooving punch having a V-shape cutting edge.

10. An apparatus according to claim 9, wherein said fixed die has a guide surface so profiled as to comport with a profile of said one surface of the wire, and said cutting edge of said movable grooving punch has a profile complementary in shape to a profile of the opposite surface of the wire.

11. An apparatus for producing a rocker joint pin for a chain, the rocker joint pin having a beveled edge at opposite end faces thereof, said apparatus comprising:

a feed unit for intermittently feeding a continuous wire longitudinally along a path;

a grooving unit disposed downstream of said feed unit for forming a V-shaped groove transversely across a surface of the wire while the wire is at rest; and a cutting unit disposed downstream of said grooving unit for severing the wire at the bottom of the V-shaped groove while the wire is at rest, thereby producing a rocker joint pin having a beveled edge at opposite end faces thereof;

wherein said grooving unit comprises a cooperating pair of aligned, movable grooving punches disposed on opposite sides of said path and reciprocally movable toward and away from each other for forming the V-shaped groove on opposite surfaces of the wire, said grooving punches having a V-shaped cutting edge, and wherein said cutting edge of one of said pair of movable grooving punches has a profile complementary in shape to a profile of one of the opposite surfaces of the wire, and said cutting edge of the other of said pair of movable grooving punches has a profile complementary in shape to a profile of the other of the opposite surfaces of the wire.

12. An apparatus for producing a rocker joint pin for a chain, the rocker joint pin having a beveled edge at opposite end faces thereof, said apparatus comprising:

a feed unit for intermittently feeding a continuous wire longitudinally along a path;

a grooving unit disposed downstream of said feed unit for forming a V-shaped groove transversely across a surface of the wire while the wire is at rest; and a cutting unit disposed downstream of said grooving unit for severing the wire at the bottom of the V-shaped groove while the wire is at rest, thereby producing a rocker joint having a beveled edge at opposite end faces thereof;

wherein said cutting unit comprises a fixed cutting die having a guide hole aligned with said path for the passage therethrough of the wire, and a movable cutting die having a guide hole normally disposed in alignment with said path for the passage therethrough of the wire, said movable cutting die being movable relative to said fixed die between a first position in which said guide hole in said fixed cutting die and said guide hole in said movable cutting die are aligned with each other, and a second position in which said movable cutting die is offset from said path in a direction orthogonal to the path.

13. An apparatus according to claim 12, further comprising a knockout pin reciprocally movable within said guide hole in said movable cutting die for discharging a rocker joint pin from said movable cutting die while said movable cutting die is disposed in said second position.

* * * * *

UNITED STATES PATENT AND TRADEMARK OFFICE
CERTIFICATE OF CORRECTION

PATENT NO.    : 6,427,433 B1                                                Page 1 of 1
DATED         : August 6, 2002
INVENTOR(S)   : Seiichi Kubota et al.

It is certified that error appears in the above-identified patent and that said Letters Patent is hereby corrected as shown below:

Column 1,
Line 53, delete "the";

Column 2,
Line 31, change "achieved" to -- carried out --;

Column 5,
Line 14, change "die" to -- die 20 --;

Column 6,
Line 13, add a period (.) after "plates";

Column 8,
Line 47, change "joint" to -- joint pin --.

Signed and Sealed this

Twenty-eighth Day of January, 2003

JAMES E. ROGAN
*Director of the United States Patent and Trademark Office*